United States Patent [19]

Matsuura et al.

[11] Patent Number: 5,550,330
[45] Date of Patent: Aug. 27, 1996

[54] DIGITIZING CONTROL APPARATUS

[75] Inventors: Hitoshi Matsuura, Hachioji; Osamu Tsukamoto, Minamitsuru-gun, both of Japan

[73] Assignee: Fanuc Limited, Yamanashi, Japan

[21] Appl. No.: 401,643

[22] Filed: Mar. 10, 1995

Related U.S. Application Data

[63] Continuation of Ser. No. 64,161, May 24, 1993, abandoned.

[30] Foreign Application Priority Data

Oct. 16, 1991 [JP] Japan ................................. 3-267681

[51] Int. Cl.⁶ ........................................................ G08C 21/00
[52] U.S. Cl. ............................................. 178/18; 178/19
[58] Field of Search ............................. 178/18, 19; 364/453, 364/474.03, 474.05, 474.28, 560, 565, 566

[56] References Cited

U.S. PATENT DOCUMENTS

| | | | |
|---|---|---|---|
| 3,904,821 | 9/1975 | Whetstone | 178/19 |
| 3,924,450 | 12/1975 | Uchiyama | 73/67 |
| 3,956,588 | 5/1976 | Whetstone | 178/19 |
| 4,688,184 | 8/1987 | Taniguti et al. | 364/560 |
| 4,798,919 | 1/1989 | Miessler | 178/18 |
| 4,980,519 | 12/1990 | Mathews | 178/19 |
| 4,990,726 | 2/1991 | Lasley | 178/18 |
| 5,088,055 | 2/1992 | Oyama | 364/560 |
| 5,181,181 | 1/1993 | Gilynn | 364/566 |
| 5,243,265 | 9/1993 | Matsuura | 364/474.03 |
| 5,247,233 | 9/1993 | Matsuura et al. | 364/474.05 |
| 5,274,563 | 12/1993 | Matsuura et al. | 364/474.03 |

FOREIGN PATENT DOCUMENTS

| | | |
|---|---|---|
| 63-99154 | 4/1988 | Japan . |
| 1-191012 | 8/1989 | Japan . |
| 3-60956 | 3/1991 | Japan . |
| 3-121754 | 5/1991 | Japan . |

*Primary Examiner*—Stephen Chin
*Assistant Examiner*—Vijay Shankar
*Attorney, Agent, or Firm*—Staas & Halsey

[57] ABSTRACT

The present invention relates to a digitizing control apparatus for outputting smooth data along an original tracing path by correcting digitized data. Coordinate data of a digitized model surface is calculated by adding coordinate data commanding a tracing path on a model surface to the measuring displacements at trace measuring points of a sensor. Coordinate data of the respective trace measuring points is corrected to digitized data approximated by a new coordinate point on a tracing plane containing the tracing path. Corrected coordinate data is output as smooth digitizing data along the original trace path.

1 Claim, 5 Drawing Sheets

DIGITIZING CONTROL APPARATUS

This application is a continuation of application number 08/064,161, filed May 24, 1993, now abandoned.

TECHNICAL FIELD

The present invention relates to a digitized control apparatus for outputting digitizing data of a model configuration from a measuring displacement of a sensor tracing a three-dimensional model surface, and more specifically, to a digitizing control apparatus by which digitized data obtained from trace measuring points deviated from an original path can be corrected.

BACKGROUND ART

Conventionally, when digitized data is output by tracing a three-dimensional model surface, a straight line or the like set on the model surface is commanded as a tracing path and data is fetched at preset intervals while moving a sensor. When the model surface is not abruptly changed with respect to a direction in which the sensor is moved, the sensor fetches distance data from the measuring points on the model surface located substantially along the tracing path, but at a position where an inclination of the model is abruptly changed, the apparent measurement origin set to the sensor may bite into the model surface or leave therefrom.

As a result, a non-contact type optical sensor, for example, outputs measuring points deviating from a tracing point to a model. Therefore, a value obtained by adding the displacements of a measuring point to an actual position of a sensor at the time of measurement is output as digitized data.

When, however, a trace machining is actually executed based on digitized data output based on trace measuring points deviating from an original tracing path, a tool is finely oscillated with respect to a workpiece not only vertically but also horizontally about an initially set tracing path, which abruptly affects a machine tool for controlling a position of the tool. Further, a problem arises in that since the tool is controlled in a zigzag manner, the machining surface of the workpiece cannot be smoothly finished.

DISCLOSURE OF THE INVENTION

Taking the above into consideration, an object of the present invention is to provide a digitizing control apparatus which outputs smooth data along an original tracing path by correcting digitized data.

To attain the above object, according to the present invention, there is provided a digitizing control apparatus for outputting digitized data of a model configuration from measuring displacements of a sensor tracing a three-dimensional model surface, which comprises a calculation means for calculating coordinate data of a digitized model surface by adding coordinate data commanding a tracing path on the model surface to the measuring displacements at trace measuring points of the sensor and a correction means for correcting the coordinate data of the respective trace measuring points to digitized data approximated by a new coordinate point on a tracing plane containing the tracing path.

A moving command is applied to the sensor from the digitizing control apparatus so that measuring displacements in accordance with a model configuration is output. The measuring displacements of the sensor are added to the coordinate data of the commanded tracing path to calculate the coordinate data of the trace measuring points on a model, and further the coordinate data of the respective trace measuring points is corrected to digitized data approximated by the new coordinate points on a plane containing the tracing path of the sensor,

BEST MODE OF CARRYING OUT THE INVENTION

An embodiment of the present invention will be described below with reference to the drawings.

Figure 1:
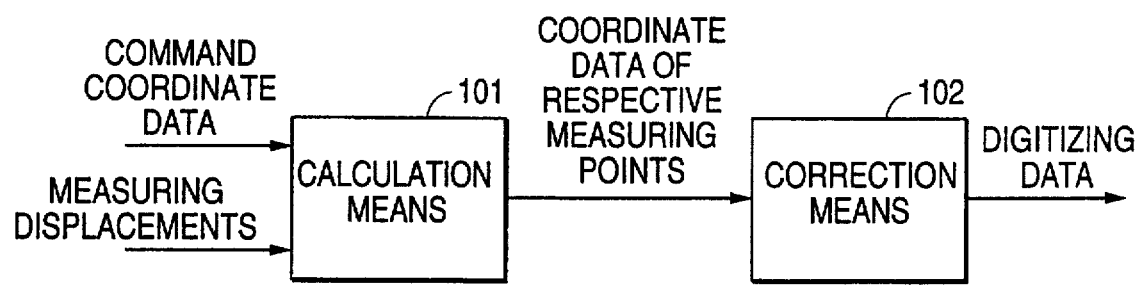
FIG. 1 is a diagram showing the schematic arrangement of a digitizing control apparatus according to the present invention.

FIG. 1 is a diagram showing the schematic arrangement of a digitizing control apparatus according to the present invention. Note, FIG. 1 shows the minimum arrangements necessary for embodying the present invention.

A calculation means 101 adds command coordinate data for commanding a tracing path onto a model surface to the measuring displacements at trace measuring points of a sensor and calculates coordinated data of a digitized model surface.

Further, a correction means 102 corrects coordinate data at a plurality of trace measuring points calculated by the calculation means 101 to digitized data approximated by the new coordinate points on a tracing place including a tracing path and outputs the same.

Figure 2:
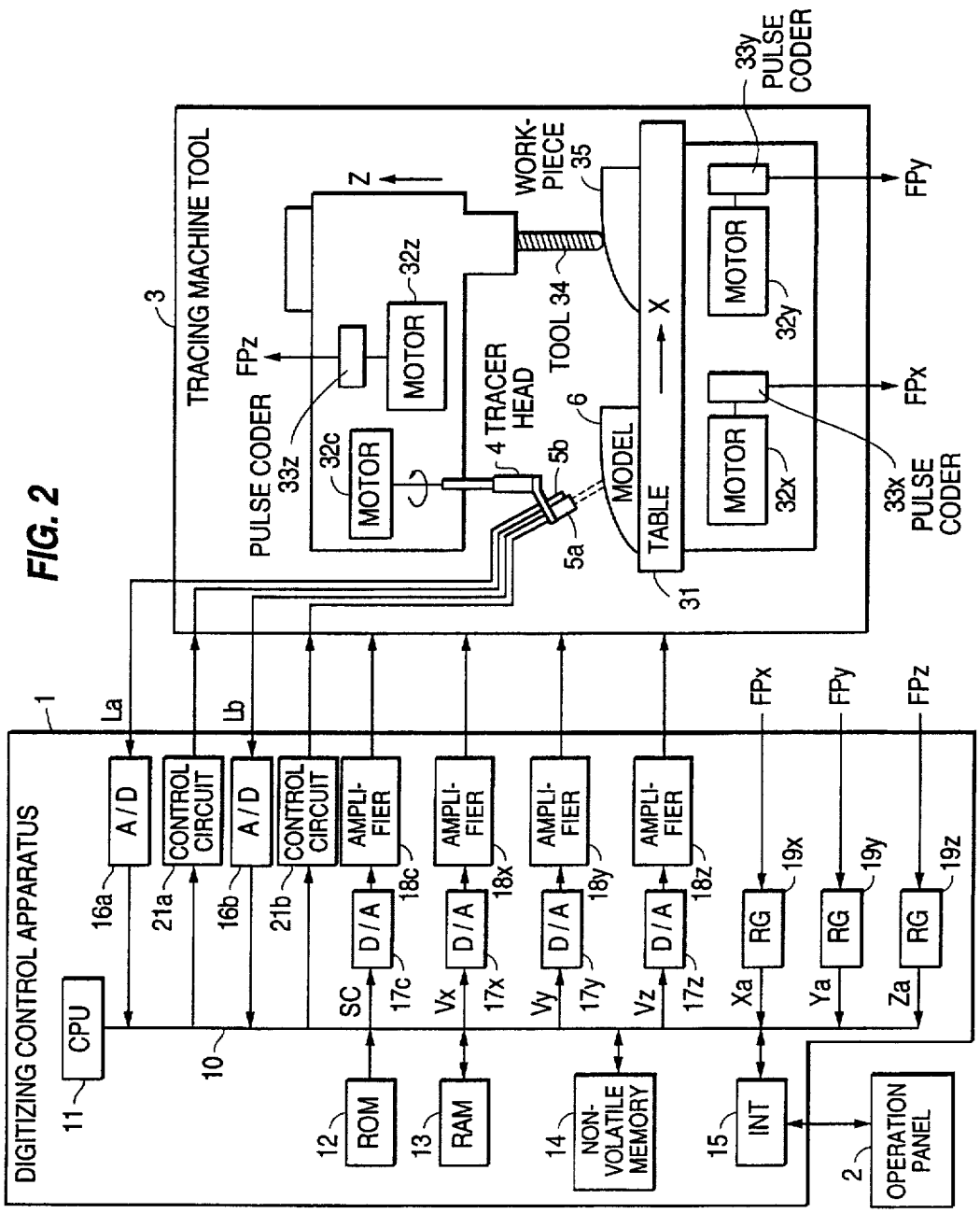
FIG. 2 is a block diagram showing the arrangement of the digitizing control apparatus and peripheral unit according to the present invention.

FIG. 2 is a block diagram showing the arrangement of the digitizing control apparatus and peripheral unit according to the present invention, wherein a processor (CPU) 11 controls the entire operation of a digitizing control apparatus 1. A ROM 12 composed of an EPROM or EEPROM stores a system program for controlling the digitizing control apparatus 1. Therefore, the processor 11 reads out the system program stored in the ROM 12 through a bus 10 and controls the operation of the digitizing control apparatus 1 in accordance with the system program.

A RAM 13 for temporarily storing various data stores temporary data such as measuring values from optical type distance sensors 5a and 5b to be described later, and the like. A non-volatile memory 14 supplied with power from a not shown battery stores various parameters such as a tracing direction, tracing speed and the like input through an interface 15 from an operation panel 2.

A tracing machine tool 3 has a tracer head 4 provided with the optical type distance sensors 5a and 5b disposed in proximity to each other. Each of the optical type distance sensors 5a and 5b is composed of a reflected light amount type sensor with a light source composed of a semiconductor laser or light emitting diode and measures a distance up to a model 6 as a displacement from a reference distance set thereto without coming into contact with the model. Measuring values La and Lb measured by these distance sensors are converted into digital values by the A/D converters 16a and 16b in the digitizing control apparatus 1 and sequentially read by the processor 11.

The processor 11 calculates the displacements of respective axes based on the measuring values La and Lb and the signals from present position registers 19x, 19y and 19z to be described later as well as generates speed commands Vx, Vy and Vz to respective axes based on the displacements and a commanded tracing direction and speed by a known technology, These speed commands are converted into analog values by D/A converters 17x, 17y and 17z and input to servo amplifiers 18x, 18y and 18z. The servo amplifiers 18x and 18y drive the servo motors 32x and 32y of the tracing machine tool 3 based on these speed commands, by which a table 31 is moved in an X-axis direction and a Y-axis direction which is at right angles to the plane of the paper. Further, a servo amplifier 18z drives a servo motor 32z, by which the tracer head 4 and a tool 34 all moved in a Z-axis direction.

The servo motors 32x, 32y and 32z are provided with pulse coders 33x, 33y and 33z for generating sensing pulses FPx, FPy and FPz each time they rotate a predetermined amount. The present position registers 19x, 19y and 19z in the digitizing control apparatus 1 count up/down the sensing pulses FPx, FPy and FPz in accordance with the respective rotational directions, determine the present position data Xa, Ya and Za of the respective axial directions and input the same to the processor 11.

On the other hand, the processor 11 samples the measuring values La and Lb of the distance sensors 5a and 5b at each predetermined sampling time simultaneously with the control of the above respective axes, determines the normal vector of the surface of a model 6 by using the sampling data and generates a rotation command SC corresponding to the direction of the normal vector projected on an X-Y plane. The rotation command SC is converted into an analog value by a D/A converter 17c and then input to a servo amplifier 18c. The servo amplifier 18c drives the servo motor 32c of a V-axis based on the command.

With this arrangement, the tracer head 4 is controlled to be rotated in accordance with a command angle β as well as to keep a predetermined reference distance between the model 6 and it. Further, at the same time, the table 31 is moved in the tracing direction at the tracing speed and a workpiece 35 is machined to the same configuration as that of the model 6 by the tool 34 having a Z-axis controlled in the same way as the tracer head 4.

An automatic measuring point correction method of the digitizing control apparatus according to the present invention will be described below with reference to FIGS. 3, 4 and 5.

Figure 3:
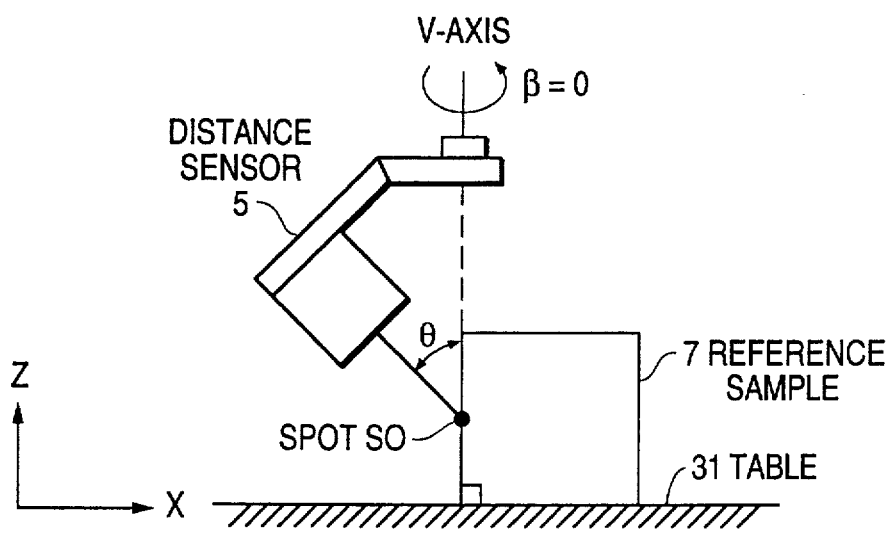
FIG. 3 is a schematic diagram of a distance sensor constituting a tracer head.

FIG. 3 is a schematic diagram of the distance sensor 5 constituting the tracer head 4, wherein a spot formed by the distance sensor 5 is shown by a black dot. The distance sensors 5a and 5b are mounted to the tracer head 4 with an angle θ inclined with respect to a vertical axis (V-axis) in parallel with the Z-axis. Further, a reference sample 7 (e.g., a cube) placed on the table 31 is a body having at least one reference plane vertical to the table 31, and it is placed here on the table 31 so that the reference plane is perpendicular to the X-axis of the coordinate system set to the table These distance sensors 5a and 5b are rotated about the V-axis along a circle having a predetermined radius at the angle β commanded by the rotation command SC. FIG. 3 shows the state that the reference sample 7 is placed at the position spaced apart from the distance sensor 5 by a reference distance and a spot is formed at the zero point SO of the reference sample 7, Then, the distance sensor 5 emits a light and receives the light reflected from the spot to measure a distance between the sensor and the spot, Further, measured data is processed by the processor 11 and stored in the RAM 13 or the like as a measuring point Sn (Xn, Yn, Zn). Note, n represents an integer larger than 1.

Next, a method of correcting a coordinate value obtained at a predetermined position by moving the tracer head 4 along the model surface to digitized data will be described.

Figure 4:
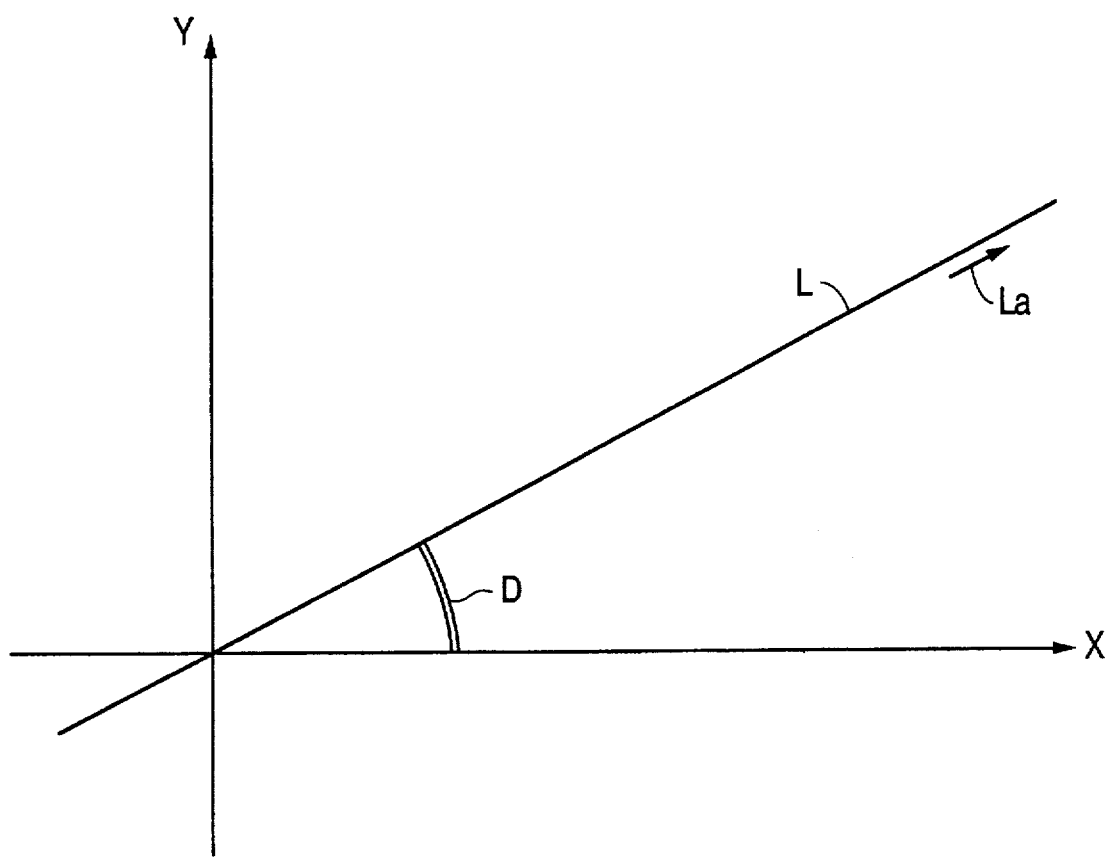
FIG. 4 is a diagram showing an angle between a tracing path and the position of a machine (coordinate of the machine)

FIG. 4 is a diagram showing an angle between a tracing path L for tracing the model surface and an X-axis in a plane of a machine coordinate (X-Y axis) plane for specifying a machine position. When the tracer head 4 moves in the direction of an arrow La along the tracing path L, an angle D is established between the X-axis and the path L in the plane of the machine coordinate.

Figure 5:
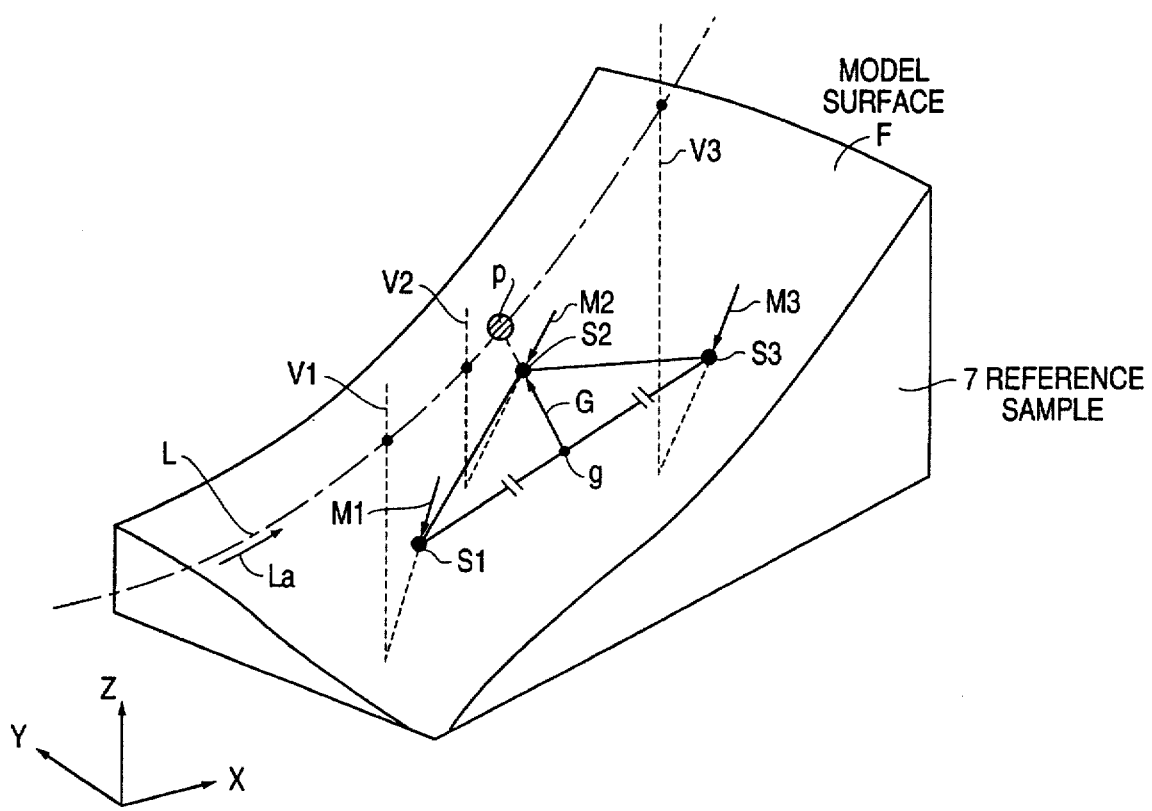
FIG. 5 is a schematic diagram showing a method of correcting digitizing data.

FIG. 5 is a schematic diagram showing a method of correcting digitizing data in the model surface, wherein the tracing path L is a path along which the tracer head 4 moves on the model surface F in the direction of the arrow La. Axes V1, V2, V3 represent the V-axis as the center of rotation of the sensor shown in FIG. 3.

Further, the emitting directions M1, M2, M3 from the distance sensor 5 are determined so that the point at which the tracer head 4 intersects the V-axis becomes the zero point of the distance sensor 5. Spots formed on the model surface F by a light emitted from the distance sensor 5 are assumed to be represented by measuring points S1 (X1, Y1, Z1), S2 (X2, Y2, Z2) and S3 (X3, Y3, Z3), respectively, Here, the measuring point S1 is a point measured two times before, the measuring point S2 is a point measured the last time and the measuring point S3 is a point measured this time. Further, the machine position at the measuring point S2 is represented by m (Xm, Ym, Zm).

Further, the middle point between the measuring points S1 and S3 is represented by g, the vector passing through the middle point g and measuring point S2 is represented by G (Xv, Yv, Zv), and the intersecting point of the vector G and a tracing plane is represented by a correcting point P (X, Y, Z). Note, the tracing plane is a plane containing the tracing path L and the axes V1, V2, V3. A method of calculating a coordinate value of the correcting point P of the measuring point S2 will be described.

First, with respect to the measuring point S1, S2 and S3, the vector G passing through the middle point g and the measuring point S2 is determined from the coordinate data stored in the RAM 13 or the like as follows.

$$Xv = X2 - (X1 + X3)/2 \quad (1)$$

$$Yv = Y2 - (Y1 + Y3)/2 \quad (2)$$

$$Zv = Z2 - (Z1 + Z3)/2 \quad (3)$$

At this time, since a unit vector from the measuring point S2 to the correcting point P coincides with a unit vector of the vector G, the following equation (4) is established.

$$(X-X2)/Xv=(Y-Y2)/Yv=(Z-Z2)/Zv=t \text{ (:constant)} \quad (4)$$

When the equation (4) is rearranged with respect to X, Y and Z, the following equations can be obtained.

$$X=t \cdot Xv+X2 \quad (5)$$

$$Y=t \cdot Yv+Y2 \quad (6)$$

$$Z=t \cdot Zv+Z2 \quad (7)$$

Further, since the correcting point P is located on the tracing plane at all times, and as shown in FIG. 4, since the machine position m moving along the tracing path L is also located on the tracing plane, the following equation is established.

$$Y-Ym=\tan D \cdot (X-Xm) \quad (8)$$

Thus, t is determined by substituting the equation (8) for the equations (5) and (6) as follows.

$$(t \cdot Yv+Y2)-Ym=\tan D \cdot ((t \cdot Xv+X2)-Xm)$$

$$t \cdot Yv-\tan D \cdot t \cdot Xv = -Y2+Ym+\tan D \cdot (X2-Xm)$$

$$t=(-Y2+Ym+\tan D \cdot (X2-Xm))/(Yv-\tan D \cdot Xv) \quad (9)$$

Then, the coordinate values of the correcting point P can be obtained by substituting the equation (9) for the equations (5), (6) and (7) as follows.

$$X=Xv \cdot (-Y2+Ym+\tan D \cdot (X2-Xm))/(Yv-\tan D \cdot Xv)+X2 \quad (10)$$

$$Y=Yv \cdot (-Y2+Ym+\tan D \cdot (X2-Xm))/(Yv-\tan D \cdot Xv)+Y2 \quad (11)$$

$$Z=Zv \cdot (-Y2+Ym+\tan D \cdot (X2-Xm))/(Yv-\tan D \cdot Xv)+Z2 \quad (12)$$

Therefore, a tracing plane is regulated to the tracing plane containing the original tracing path by converting the coordinate values of the correcting point P to digitize data and outputting the same. As a result, a trace made on a workpiece by machining is made smooth and an adverse affect such as oscillation and the like to a machine tool itself caused by a grinding operation or the like can be removed.

Figure 6:
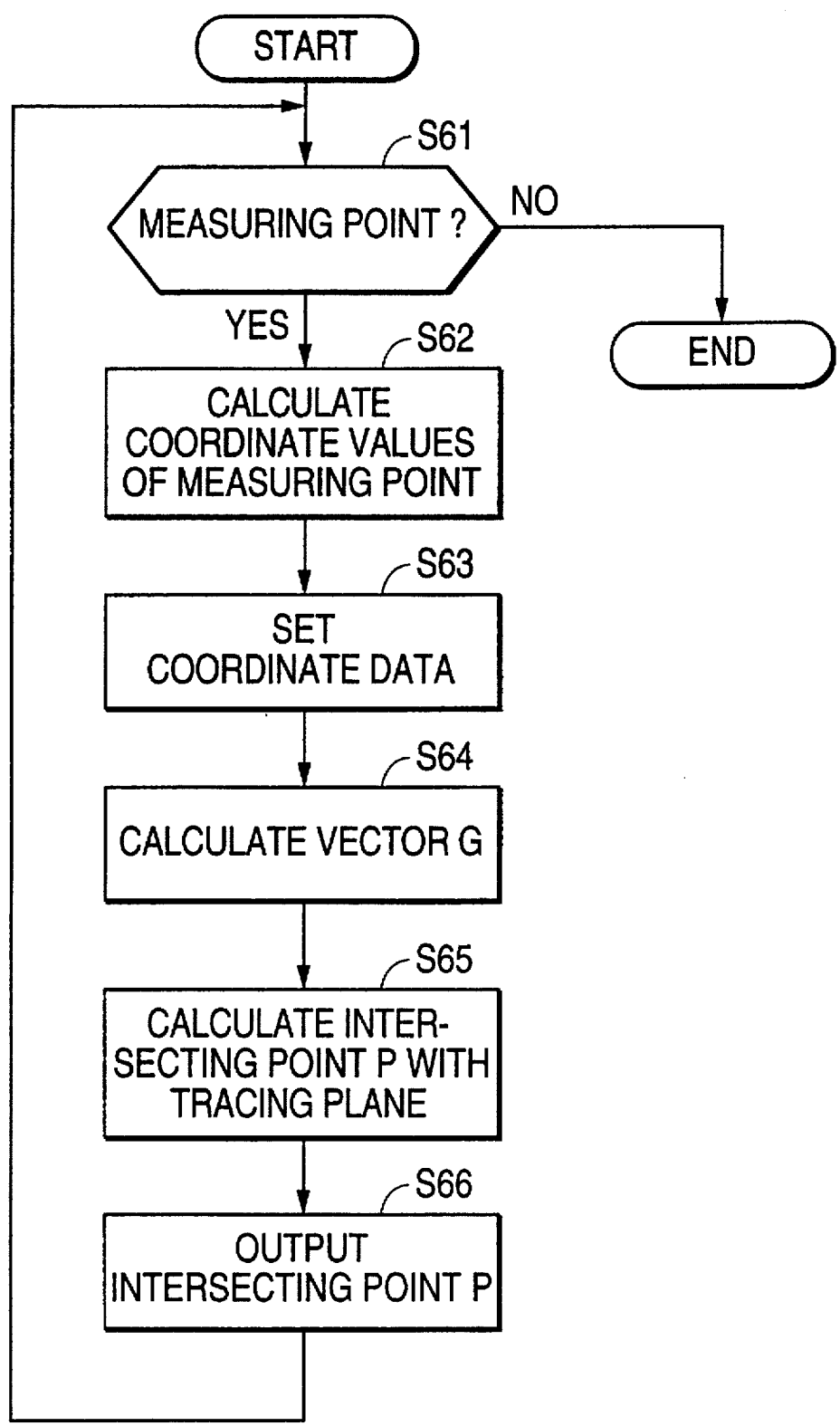
FIG. 6 is a flowchart for executing an automatic measuring point correcting calculation processing in a digitizing control apparatus.

FIG. 6 is a flowchart for executing an automatic measuring point correcting calculation processing in the digitizing control apparatus according to the present invention, wherein numerals prefixed with an "S" indicate the numbers of steps of the process.

[S61] It is determined whether a measuring point exists or not. That is, it is determined whether a new measuring point exists or not. If the new measuring point exists (YES), the process goes to step S62, and when the new measuring point does not exist (NO), this calculation processing is finished.

[S62] Coordinate values of the measuring point are calculated. More specifically, coordinate values of the present measuring point are determined by adding measuring displacements obtained by the distance sensor to the machine position (machine coordinate).

[S63] Coordinate data is set. More specifically, the coordinate determined at step 62 is used as the measuring point S3, the coordinate measured the last time is used as the measuring point S2 and the coordinate measured two times before is used as the measuring point S1.

[S64] The vector G is calculated. More specifically, the vector G is calculated by using the equations (1), (2) and (3).

[S65] An intersecting point with the tracing plane is calculated. More specifically, coordinate values of the correcting point P are calculated by using the equations (10), (11) and (12).

[S66] The coordinate values of the correcting point P are output as digitizing data. More specifically, the data of the intersecting point determined at step S65 is converted into digitized data and output. Thereafter, the process returns to step S61 for processing a next measuring point.

In the above description, although the coordinates of the previously measured measuring points are used as the coordinate values set for the measuring points S1, S2, the intersecting points determined previously by the automatic measuring point correcting calculation processing may be used.

Further, although the coordinate data of each trace measuring point is corrected to digitized data approximated by the new coordinate point on the tracing plane containing the tracing path of the sensor based on the measuring displacements of the sensor and the coordinate data of the commanded tracing path, a position of the Z-axis proportional to the moving distance of the sensor in the X-Y plane may be used a new coordinate point based on the measuring displacement in the Z-axis direction of the measuring displacements of the sensor.

More specifically, the correction means 102 can determine only the Z-axis data of the new coordinate point as described below. In FIG. 5, it is assumed that the X- and Y-coodinates of the present measuring point S3 are the X- and Y-coordinates of the machine position m3. Further, a measuring point of the last time is represented by S2, a machine position at this time is represented by m2, and the Z-axis of a digitized coordinate is represented by $Zd_2$ in the same way. Then, when it is assumed that a distance between the measuring points S3 and S2 is represented by Ps and a distance between the machine positions m3 and m2 is represented by Pm with respect to the X-Y plane, a Z-coordinate $Zd_3$ of the present measuring point S3 is determined by the following equation.

$$Zd_3=(Pm \times (Z3-Z2)/Ps)+Zd_2$$

Note, although the reflected light amount type distance sensor is described as the optical type distance sensor in the above embodiment, the present invention may be also applied to a digitizing control apparatus using a triangulation type distance sensor in addition to the above.

As described above, according to the present invention, since digitized data to be output is regulated to a tracing plane containing an originally set tracing path, even if a model surface is abruptly changed, a trace made on a workpiece by machining is made smooth and an adverse affect such as oscillation and the like to a machine tool itself caused by a grinding operation or the like can be removed. Further, digitized data can be compressed by making use of the data of a tracing plane and thus an amount of wasteful data for trace machining can be reduced.

We claim:

1. A digitizing control apparatus for outputting digitized data of a model configuration from measuring displacements of a sensor tracing a three-dimensional model surface, comprising:

calculation means for calculating coordinate data of a digitized model surface by adding coordinate data commanding a tracing path on said three-dimensional model surface to the measuring displacements at trace measuring points of said sensor; and correction means for correcting the coordinate data of said trace measuring points to digitize data approximated with a new coordinate point on a tracing plane containing said tracing path by using a trace measuring point where a vector connecting the center of gravity of said trace measuring point and the measuring points located in front of and behind said trace measuring point to said trace measuring point intersects a tracing plane containing said tracing path as a new coordinate point.

* * * * *

UNITED STATES PATENT AND TRADEMARK OFFICE
CERTIFICATE OF CORRECTION

PATENT NO. : 5,550,330
DATED : August 27, 1996
INVENTOR(S) : Hitoshi MATSUURA, et al.

It is certified that error appears in the above-indentified patent and that said Letters Patent is hereby corrected as shown below:

On title page, item [54] and col. 1,

IN THE TITLE: Please change the title to: --DIGITIZING CONTROL APPARATUS FOR DIGITIZING DATA OF MODEL CONFIGURATION--

On title page,

ITEM [75] - change "Hachioji" to --Tokyo--

ITEM [30] - Foreign Appln. Priority Data: Please add --October 12, 1992, PCT JP92/01329--

Col. 1, line 7, change "digitized" to --digitizing--
line 8, change "digitizing" to --digitized--
Col. 2, line 22, change "digitizing" to --digitized--
Col. 3, line 17, change "," to --.--
line 25, change "all" to --are--
Col. 4, line 3, after "table" insert --31.--
line 11, change "," to --.--

Signed and Sealed this

Fourth Day of February, 1997

Attest:

BRUCE LEHMAN

Attesting Officer

Commissioner of Patents and Trademarks